(12) United States Patent
Geier

(10) Patent No.: US 10,934,080 B2
(45) Date of Patent: Mar. 2, 2021

(54) FLUID MEDIUM DISPENSING SYSTEM AND A METHOD OF ASSEMBLING A DISPENSING SYSTEM FOR A FLUID MEDIUM

(71) Applicant: Coster Tecnologie Speciali S.p.A., Calceranica al Lago (IT)

(72) Inventor: Adalberto Geier, Villazzano (IT)

(73) Assignee: Coster Tecnologie Speciali S.p.A., Calceranica al Lago (IT)

(*) Notice: Subject to any disclaimer, the term of this patent is extended or adjusted under 35 U.S.C. 154(b) by 0 days.

(21) Appl. No.: 16/469,813

(22) PCT Filed: Jan. 17, 2017

(86) PCT No.: PCT/EP2017/050898
§ 371 (c)(1),
(2) Date: Jun. 14, 2019

(87) PCT Pub. No.: WO2018/133925
PCT Pub. Date: Jul. 26, 2018

(65) Prior Publication Data
US 2020/0087053 A1 Mar. 19, 2020

(51) Int. Cl.
*B65D 83/38* (2006.01)
*B65D 83/62* (2006.01)
(Continued)

(52) U.S. Cl.
CPC .............. *B65D 83/38* (2013.01); *B65D 83/62* (2013.01); *B29B 2911/1402* (2013.01);
(Continued)

(58) Field of Classification Search
CPC ........ B65D 83/38; B65D 83/62; B65D 83/68; B65D 83/48; B65D 83/425;
(Continued)

(56) References Cited

U.S. PATENT DOCUMENTS 2,658,714 A * 11/1953 Fooshee ............... B65D 83/205
251/353
4,969,577 A * 11/1990 Werding ................ B65D 83/14
141/3
(Continued)

FOREIGN PATENT DOCUMENTS

DE  10 2013 107 061 A1  1/2015
WO  WO-2016/205022 A1  12/2016
(Continued)

OTHER PUBLICATIONS

International Search Report and Written Opinion for Application No. PCT/EP2017/050898, dated Sep. 28, 2017.

*Primary Examiner* — Paul R Durand
*Assistant Examiner* — Randall A Gruby
(74) *Attorney, Agent, or Firm* — Marshall, Gerstein & Borun LLP

(57) ABSTRACT

The present invention provides a fluid medium dispensing system (1) for dispensing a fluid medium stored under pressure. The system (1) comprises a container (3) for storing the fluid medium under pressure, the container (3) comprising a neck (5) defining an opening (6). A valve cup (2) supporting a valve (4) closes the opening (6) of the container (3). Contiguous portions (14, 5) of the valve cup (2) and the neck (5) are comprised of plastics materials. The plastics materials of these contiguous portions (14, 5) are fused to form a molten weld seam (15a; 15b) by laser welding thereby sealing the container (3). Preferably, the plastics material of the neck (5) of the container (3) is laser-transparent and the plastics material of the valve cup (2) is laser-absorbing. Advantageously, the plastics material of the valve cup (2) is a semi-crystalline polymer. The invention also provides a method of assembling a dispensing system (1) for a fluid medium. In the method a valve cup (2) is provided that has at least a peripheral portion thereof that
(Continued)

is comprised of a plastics material and that includes a valve (4). A container (3) is provided that is suitable for storing the fluid medium under pressure and that comprises a neck (5) comprised of a plastics material. The neck (5) defines an opening (6) and the valve cup (2) is positioned at the opening (5). The internal volume of the container (3) is then charged before the valve cup (2) is pressed into the neck (5) of the container (3). The plastics materials of the valve cup (2) and the neck (5) are then fused together to form the molten weld seam (15a; 15b) by laser welding thereby sealing the container (3).

28 Claims, 2 Drawing Sheets

(51) Int. Cl.
  *B65D 83/42* (2006.01)
  *B65D 83/48* (2006.01)
  *B65D 83/68* (2006.01)
(52) U.S. Cl.
  CPC ... *B29B 2911/14413* (2013.01); *B65D 83/425* (2013.01); *B65D 83/48* (2013.01); *B65D 83/68* (2013.01)
(58) Field of Classification Search
  CPC ............ B65D 83/40–625; B65D 83/52; B65D 83/525; B65D 83/54; B65D 83/543; B65D 83/546; B65D 83/56–687; B29B 2911/14413; B29B 2911/1402
  See application file for complete search history.

(56) References Cited

U.S. PATENT DOCUMENTS

| | | | | |
|---|---|---|---|---|
| 5,007,231 | A * | 4/1991 | Ingemann | B65D 77/30 53/412 |
| 5,219,005 | A * | 6/1993 | Stoffel | B65D 83/62 141/20 |
| 5,511,680 | A * | 4/1996 | Kinne | B65D 43/026 206/276 |
| 6,253,941 | B1 * | 7/2001 | VanBrocklin | B05B 11/3049 215/274 |
| 7,011,236 | B2 * | 3/2006 | VanBrocklin | B05B 11/3049 215/274 |
| 8,074,847 | B2 * | 12/2011 | Smith | B65D 83/38 222/394 |
| 8,752,731 | B2 * | 6/2014 | Nimmo | B65D 83/38 222/1 |
| 9,132,955 | B2 * | 9/2015 | Smith | F16K 1/34 |
| 9,199,783 | B2 * | 12/2015 | Wanbaugh | B05B 11/3047 |
| 9,469,468 | B2 * | 10/2016 | Shibata | B65D 83/48 |
| 9,475,636 | B2 * | 10/2016 | Mekata | B65D 25/54 |
| 10,301,104 | B2 * | 5/2019 | Smith | B65D 83/48 |
| 10,486,892 | B1 * | 11/2019 | Cassoni | B65D 83/205 |
| 10,640,284 | B2 * | 5/2020 | Franckhauser | B65D 83/38 |
| 10,661,974 | B2 * | 5/2020 | Neumann | B65D 83/62 |
| 2004/0004088 | A1 * | 1/2004 | Yerby | B65D 83/46 222/145.5 |
| 2005/0005995 | A1 * | 1/2005 | Pericard | B65D 83/62 141/20 |
| 2005/0155980 | A1 | 7/2005 | Neuhalfen | |
| 2006/0006200 | A1 * | 1/2006 | Lasserre | B65D 83/60 222/402.1 |
| 2007/0241131 | A1 * | 10/2007 | Smith | B65D 83/0061 222/95 |
| 2008/0272145 | A1 * | 11/2008 | Nimmo | B65D 83/62 222/95 |
| 2010/0206911 | A1 * | 8/2010 | Bernhard | B65D 83/62 222/386.5 |
| 2013/0037580 | A1 * | 2/2013 | Armstrong | B29B 11/06 222/402.1 |
| 2014/0209633 | A1 * | 7/2014 | McDaniel | B29C 49/0073 222/95 |
| 2016/0101925 | A1 * | 4/2016 | Franz | B65D 83/38 222/402.25 |
| 2016/0377186 | A1 * | 12/2016 | Smith | F16K 3/26 251/325 |
| 2017/0327302 | A1 * | 11/2017 | Brouwer | B65D 83/64 |
| 2018/0222613 | A1 * | 8/2018 | Geier | B65B 31/028 |
| 2018/0222647 | A1 * | 8/2018 | Geier | B29C 65/7805 |
| 2019/0135511 | A1 * | 5/2019 | Geier | B65D 71/0096 |
| 2019/0161268 | A1 * | 5/2019 | Geier | B65D 83/38 |
| 2019/0308763 | A1 * | 10/2019 | Vieira | B65D 47/20 |
| 2020/0016842 | A1 * | 1/2020 | Muller | B29C 66/1222 |
| 2020/0148459 | A1 * | 5/2020 | Bartolucci | A61K 8/046 |
| 2020/0180850 | A1 * | 6/2020 | Saw | B65D 83/687 |

FOREIGN PATENT DOCUMENTS

| | | |
|---|---|---|
| WO | WO-2017/021038 A1 | 2/2017 |
| WO | WO-2017/021039 A1 | 2/2017 |

* cited by examiner

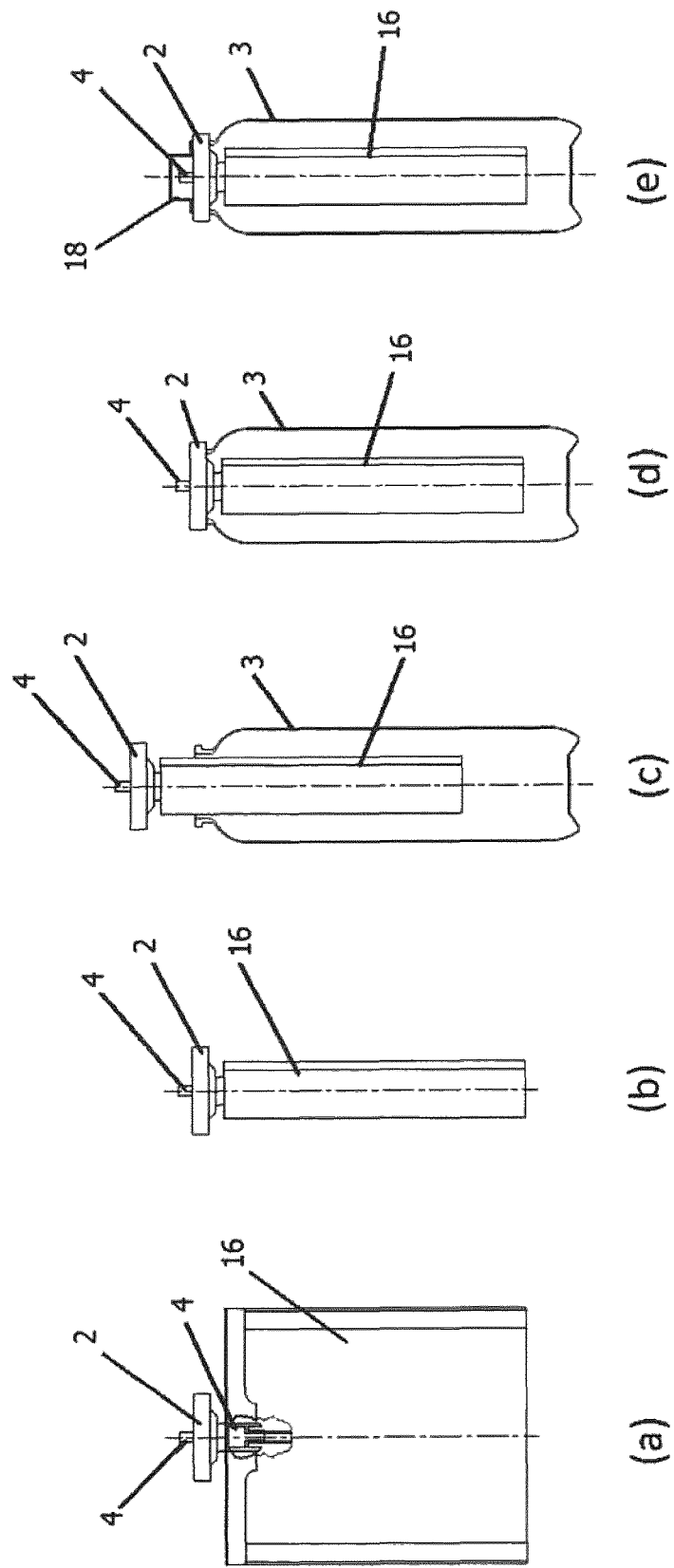

FLUID MEDIUM DISPENSING SYSTEM AND A METHOD OF ASSEMBLING A DISPENSING SYSTEM FOR A FLUID MEDIUM

The present invention relates to an improvement in sealing performance and attachment between a valve cup and a container for dispensing a fluid medium stored under pressure and also to a method of assembling such a dispensing system for dispensing a fluid medium stored under pressure.

BACKGROUND

Systems for dispensing a fluid medium stored under pressure are well-known and typically include a container, a valve, and a valve cup, wherein the valve cup supports the valve, usually centrally, and also closes off an opening of the container. The inner volume of the container is pressurized and maintained in such a state by the valve and seals between the valve cup and valve, and the valve cup and the container opening. When the valve is actuated, the pressure difference between the inner volume of the container and the outside environment causes the fluid medium to be expelled from the container. Some systems employ a two-stage container having an inner and outer container, one of which contains the propellant gas, whereas others may employ a single container with the fluid medium also acting as the propellant.

Traditionally, the containers are made from a metal, usually aluminium. Recently, there has been an increasing trend to use plastics, namely polyethylene terephthalate (PET), as the containers for these dispensing systems for various advantages such as cost and ease of manufacturing, among others. In all cases, however, the systems should be stable and be able to withstand the internal pressures of the container while also providing an adequate seal.

Conventional systems employing PET containers also typically use a metal, e.g., aluminium, for the valve cups which ensures a suitable sealing engagement between the valve cup and valve. The valve cup may be clinched to a lip of the opening of the container. While the attachment between the valve cup and container is often sufficient at most normal operating temperatures, higher temperatures can cause the PET container to deform to a large degree such that the connection between the aluminium valve cup and container opening is no longer fluid tight. This is highly disadvantageous as the propellant gas and/or the fluid medium can escape from the container.

European safety requirements specify that aerosol systems should not be exposed to temperatures above 50° C. However, in practice, such dispensing systems may be subject to much higher temperatures.

A dispensing system exhibiting sufficient sealing performance at temperatures greater than 50° C. is therefore required that enables the container and the valve cup to be made using plastics materials in order to take advantage of the considerable benefits of these materials.

SUMMARY

According to a first aspect of the present invention there is provided a fluid medium dispensing system comprising:
 a container for storing a fluid medium under pressure, the container comprising a neck defining an opening;
 a valve; and
 a valve cup adapted to support the valve and close the opening of the container, contiguous portions of the valve cup and the neck being comprised of plastics materials; and wherein
 said plastics materials of the valve cup and the neck have been fused to form a molten weld seam by laser welding thereby sealing the container.

It has been found that securing the valve cup to the neck of the container by a molten weld seam formed by laser welding not only secures the valve cup in position but also creates a seal that enables the dispensing system to withstand internal pressures of up to 13 bar. Such a seal has the advantage that it is simple and economical to employ.

Preferably also, the plastics material of the neck of the container is laser-transparent and the plastics material of the valve cup is laser-absorbing.

The laser welding of the valve cup to the neck of container involves passing a focused laser beam through the neck of the container to strike the interface between the neck and the valve cup. At the interface the laser light is turned into heat energy as it is absorbed by the plastics material of the valve cup. The heat created melts the plastics material at the interface in order to create the molten weld seam, which fuses the plastics materials of the valve cup and the neck together. Most thermoplastics transmit infrared laser radiation so laser light with a wavelength of either 980 nm or 808 nm is usually used as more energy is transmitted at these wavelengths. However, the plastics material of the valve cup must turn the light energy into heat and must therefore absorb the laser light. In order to do this the plastics material of the valve cup is preferably laser-absorbing as opposed to laser-transparent. Additives are usually used to achieve this by providing light absorbing qualities. Most often carbon black is used, but many additives will promote absorption including various pigments and fills as will be known to those skilled in the art. It should also be noted that be that laser-transparent plastics material of the neck of the container can still be colored and even opaque if special non-absorbing colorants are used.

Preferably also, the plastics material of the valve cup is a semi-crystalline polymer. It has been found that fully crystallized plastics materials tends to lose their shape during laser welding owing to the high temperatures reached. This is not the case when only semi-crystallized plastics material is used.

Semi-crystalline polyesters have a greater degree of crystallinity when compared to more amorphous polyesters and they do not deform when exposed to temperatures greater than 50° C. Crystallized PET (CPET), PBT, PEN, and PEN/PET copolymers are or can be semi-crystalline polyesters. These materials are particularly advantageous for their other properties in packaging and not just their rigidity at elevated temperatures. However, any polyester that can be semi-crystalline and does not deform to a suitable degree at large temperatures may also be used as the semi-crystalline material. Moreover, any blend of CPET, PBT, PEN, and PEN/PET may be used.

Preferably, therefore, the plastics material of the valve cup is selected from a group consisting of semi-crystallized PET, PBT, PEN, PEN/PET copolymers, POM, acrylonitrile, polypropylene, or a blend of any of the foregoing.

Preferably also, the plastics material of the neck of the container is selected from a group consisting of: crystallized PET, PBT, PEN, PEN/PET copolymers, POM, acrylonitrile, polypropylene, or a blend of any of the foregoing.

Preferably also, the whole of the valve cup is comprised of one or more laser-absorbing semi-crystalline polymers.

Likewise, preferably the whole of the container is comprised of a laser-transparent plastics material.

According to a second aspect of the present invention there is provided a method of assembling a dispensing system for dispensing a fluid medium stored under pressure, the method including:
providing a valve cup with at least a peripheral portion that is comprised of a plastics material, the valve cup including a valve
providing a container, the container being suitable for storing a fluid medium under pressure and comprising a neck that is comprised of a plastics material and that defines an opening;
positioning the valve cup at the opening of the container;
pressurizing the internal volume of the container;
pressing the valve cup into the neck of the container; and
fusing said plastics materials of the valve cup and the neck together to form a molten weld seam by laser welding thereby sealing the container.

In some embodiments a bag is attached to the valve such that its inner volume is in fluid communication with channels upstream and downstream of the valve when the valve is actuated and therefore open but is not in fluid communication with an interior volume of the container between the inside wall of the container and the outside surface of the bag. In these embodiments the bag contains the fluid medium to be dispensed by the system and the interior volume between the inside wall of the container and the outside surface of the bag contains a pressurized gas for use as a propellant.

Such bag-on-valve (BoV) packaging technologies are advantageously used for many consumer products, in particular for pharmaceutical and healthcare products. They have many advantages, in particular there is no need to use flammable propellants and they can be used with pressurized air or nitrogen. This is particularly important in the present invention as such a propellant will not have an adverse effect on the adhesive seal between the valve cup and the neck of the container.

Preferably, therefore, prior to pressuring the internal volume of the container, the method comprises the additional steps of providing a bag, attaching the valve to an opening of the bag, fluidly sealing the bag to the valve and inserting the bag into the container Preferably, the valve cup is an interference fit in the neck of the container with contact between said plastics materials of the valve cup and of the neck around the whole periphery of the valve cup. Such peripheral contact between the valve cup and the neck ensures that the molten weld seam formed during laser welding is secure around the totality of the opening in the neck that is closed by the valve cup.

Advantageously, the valve cup is pressed into the neck of the container during assembly with a force between 343 and 442 N, that is with a force between approximately 35 and 45 kg force.

Preferably, the valve cup comprises an inner part that is located in the opening of the container and the outer diameter of the inner part of the valve cup prior to pressing of the valve cup into the opening of the container is between 0.05 mm and 0.15 mm inclusive, and in particular 0.10 mm, greater than the inner diameter of the opening in order to create the interference fit.

The molten weld seam is preferably located between the inner part of the valve cup that is pressed into the opening of the container and the neck of the container.

Preferably, the valve cup comprises an outer, annular part that defines a U-shape in which a rim of the neck of the container is located. Alternatively or in addition, the molten weld seam or an additional molten weld seam is preferably located between the rim of the neck of the container and the U-shaped, outer annular part of the valve cup.

Plastic containers may be advantageous for various reasons when compared to metal containers, e.g., because of cost or ease of manufacturing. Polyesters, and in particular PET, have many advantageous qualities in packaging applications. They can be easy to manipulate and thus forming containers of PET may be relatively easier and quicker than forming them of metal. In some cases, the polyesters may also be relatively cheap. Some polyesters can also be recycled thus reducing the overall overhead cost. Finally, some polyesters can also be sterilized which is particularly advantageous for medical applications.

Hence, in one embodiment of the system above, at least the neck of the container is preferably formed from a first plastics material, which is preferably a polyester. Advantageously, the container is formed from plastics material selected from a group consisting of: crystallized PET, PBT, PEN, PEN/PET copolymers, POM, acrylonitrile, polypropylene, or a blend of any of the foregoing.

However, some plastic containers may be prone to deformation at higher temperatures. If a rigid valve cup is used and secured in a sealing manner to the plastic container even if the container deforms the container is fixed to the valve cup in such a way that the seal therebetween is not broken. In other words, the seal between the valve cup and container is maintained. Hence, use of a rigid valve cup provides the ability to make use of the advantages of plastic containers, while maintaining the seal between the valve and valve cup. Preferably, therefore, the valve cup is either formed from a semi-crystalline polyester or includes a lining formed from a semi-crystalline polyester, which lining comprises the aforesaid portion of the valve cup that is contiguous with the neck of the container. Use of a semi-crystalline polymer as opposed to a fully-crystalline polymer is advantageous for the reasons given above.

Other preferred additional features of the various aspects of the present invention are described in the dependent claims appended hereto.

DESCRIPTION OF THE DRAWINGS

FIG. 3 shows various stages in a method of assembling a dispensing system in accordance with the second aspect of the present invention.

DETAILED DESCRIPTION

The drawings and following description relate to embodiments of the various aspects of the present invention by way of example only.

Figure 1:
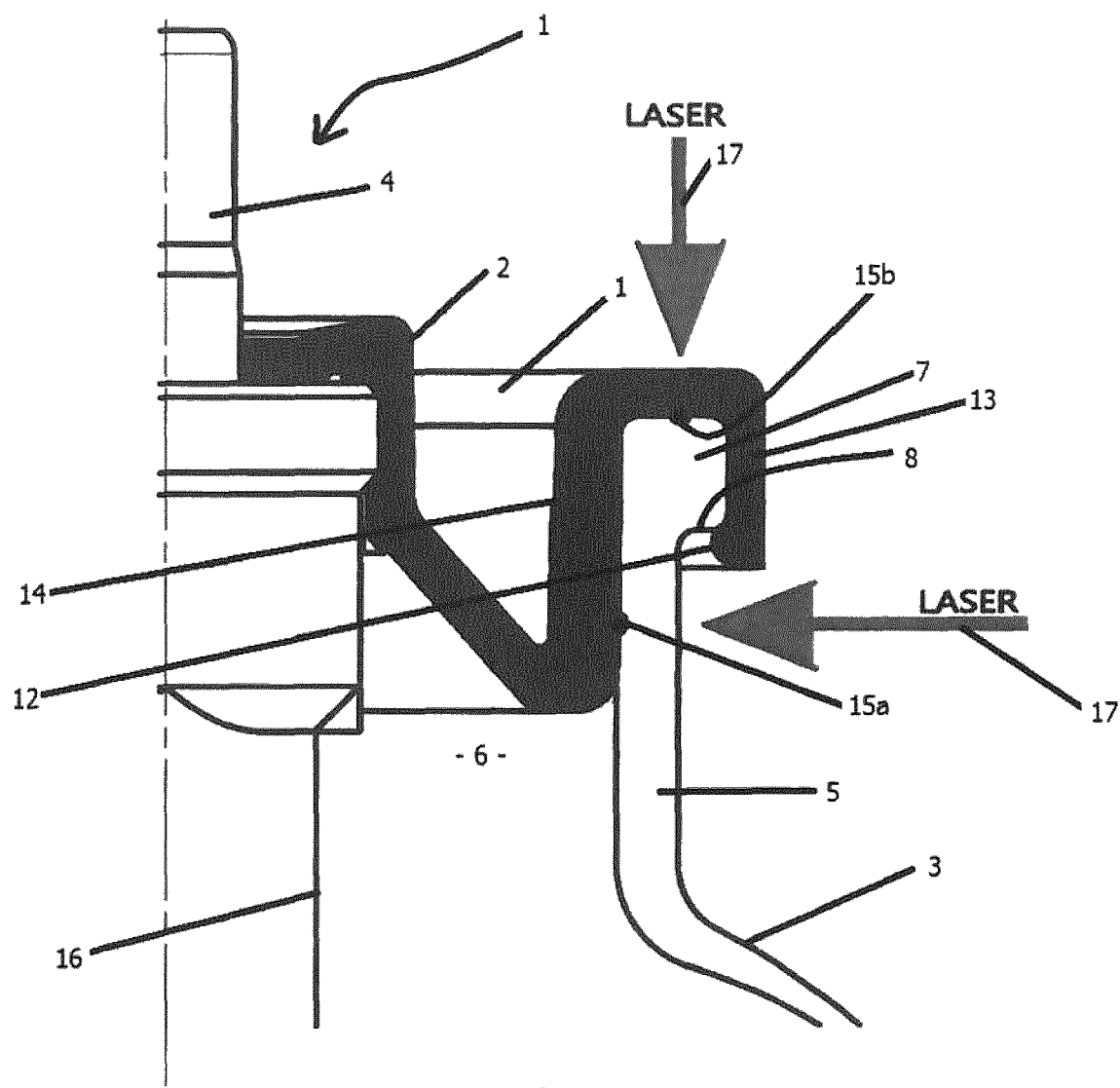
FIG. 1 shows is a vertical cross-section of part of a first embodiment of fluid medium dispensing system in accordance with the present invention.
Figure 2:
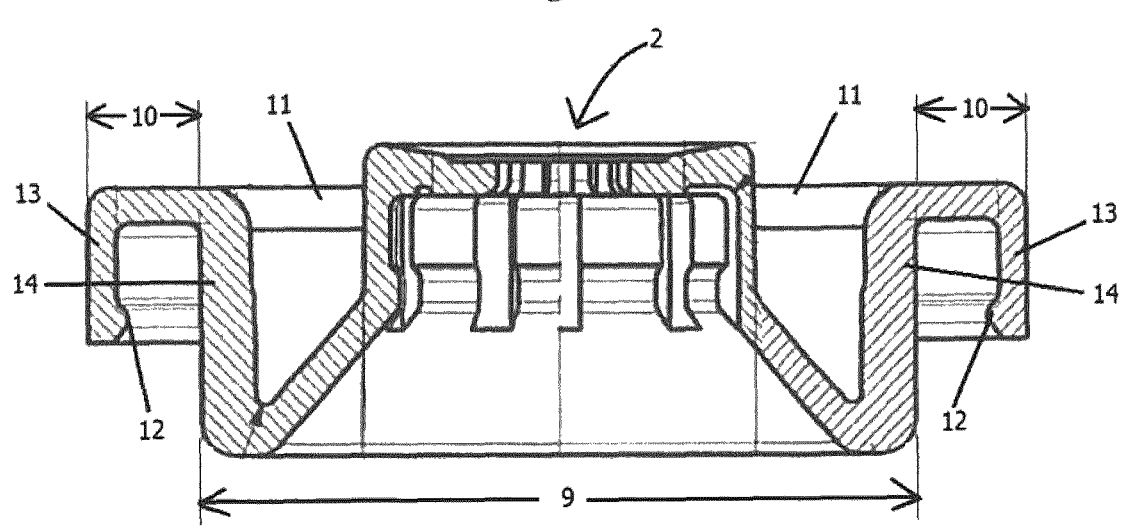
FIG. 2 is a cross-section of an embodiment of valve cup for use in a fluid medium dispensing system in accordance with the present invention.

FIG. 1 shows an example of a fluid medium dispensing system 1 in accordance with the present invention. The dispensing system 1 includes a valve cup 2, a container 3, and a valve 4. Typically, in use the inner region of the container 3 is pressurized to a pressure greater than atmospheric pressure. When a fluid medium is stored within the container 3 this pressure is typically around 7 bar although the pressure is not limited to this value and may take any desired value limited only by regional or governmental restrictions. The valve 4 is generally held in a fixed position by the valve cup 2 such that when a force is applied to the valve 4 by a user, the valve 4 is actuated to an open position. In this position, the pressure difference within and without the container 3 causes the fluid medium to be distributed from the container 3 via the valve 4. The valve 4 is not shown in any detail in the drawings as any suitable known valve can be used.

The container 3 comprises a neck 5 defining an opening 6 in which the valve cup 2 is inserted. The neck 5 also includes a rim 7 that preferably comprises an annular lip 8.

The valve cup 2 comprises a first, inner part 9 that is located in the opening 6 of the container 3 and a second, annular part 10 that covers the rim 7. The first part 9 is adapted to retain the valve 4 in a conventional manner and a plurality of strengthening ribs 11 may be provided located between the first and second parts 9 and 10. Preferably, the first part 9 is an interference fit into the opening 6 of the neck 5 around the whole periphery of the first part 9. The outer diameter of the first part 9 and the diameter of the opening 6 are therefore predetermined in order to control the degree of force required to push-fit the first part of the valve cup 2 into the opening 6. Preferably, the outer diameter of the inner part 9 is between 0.05 mm and 0.15 mm inclusive, and in particular 0.10 mm, greater than the inner diameter of the opening 6 prior to pressing of the first part 9 into the opening 6 in order to create the interference fit. During assembly, as described below, the valve cup 2 is pressed into the opening 6 of the neck 5 with a force that is preferably between 343 and 442 N, that is with a force between approximately 35 and 45 kg force. In particular, the force is preferably around 392 N, that is about 40 kg force. At the same time the second part 10 of the valve cup 2 is preferably snap-fitted over the rim 7 of the neck 5. To this end the second, annular part 10 of the valve cup 2 is formed in an inverted U-shape in which the rim 7 of the neck 5 of the container 3 locates. Advantageously, the U-shaped second part 10 comprises at least one protrusion 12 on a surface of an outer leg 13 of the U-shape that faces the neck 5 of the container. The protrusion 12 preferably takes the form of an annular bead that is adapted to frictionally engage the neck 5 and to snap-fit over the rim 7 by engagement over and around the lip 8.

In addition, the U-shaped second part 10 comprises an inner leg 14 that lies contiguous with the inner surface of the neck 5 to a level below that of the outer leg 13 and the snap-fitment between the protrusion 12 and the rim 7. Also, the inner leg 14 and the neck 5 are contiguous around the whole periphery of the first part 9 of the valve cup 1 that is inserted into the neck 5. This is important because the container 3 is sealed after pressurization, as is described below, by laser welding of the valve cup 2 to the container 3. During this process the contiguous parts of the valve cup 2 and the container 3 are fused to form a molten weld seam 15a and/or 15b. The seam 15a, 15b seals the container 3 and the peripheral contact between the first part 9 of the valve cup and the neck 5 ensures that the molten weld seam 15a, 15b is secure around the totality of the opening in the neck 5 that is closed by the first part 9 of the valve cup 2.

To enable laser welding to take place, the contiguous parts of the valve cup 2 and the neck must be made of plastics material as the welding process generates heat that causes these parts to fuse together to form the molten weld seam 15a, 15b. In addition, during the laser welding a focused laser beam, shown by the labelled arrow 17 in FIG. 1, is directed at the contiguous parts of the valve cup 2 and the container 3. In some embodiments, the molten weld seam 15a is located between the inner part 9 of the valve cup 2 that is pressed into the opening 6 of the container 3 and the neck 5 of the container below the rim 7. In other embodiments, the molten weld seam 15b is located between the rim 7 of the neck 5 of the container 3 and the U-shaped, outer annular part 13 of the valve cup 2. In yet other embodiments two molten weld seams 15a and 15b are formed per container 3 in both of the aforesaid locations. The laser beam or beams are focused on the relevant interface or interfaces between the neck 5 and the valve cup 2. Hence, the plastics material of the neck 5 of the container 3 is preferably laser-transparent whereas the plastics material of the valve cup 2 is preferably laser-absorbing.

While that part of the valve cup 2 adjacent the relevant molten weld seam 15a, 15b could be provided with a plastics lining, preferably the whole of the valve cup 2 is comprised of one or more laser-absorbing polymers. In addition, it has been found that fully crystallized plastics materials tends to lose their shape during laser welding owing to the high temperatures reached. This does not occur with semi-crystalline polymers. Advantageously, therefore, preferably the whole of the valve cup 2 is comprised of one or more laser-absorbing semi-crystalline polymers.

Semi-crystalline polyesters have a greater degree of crystallinity when compared to more amorphous polyesters and they do not deform when exposed to temperatures greater than 50° C. Crystallized PET (CPET), PBT, PEN, and PEN/PET copolymers are or can be semi-crystalline polyesters. These materials are particularly advantageous for their other properties in packaging and not just their rigidity at elevated temperatures. However, any polyester that can be semi-crystalline and does not deform to a suitable degree at large temperatures may also be used as the semi-crystalline material. Moreover, any blend of CPET, PBT, PEN, and PEN/PET may be used. Such polymers are made laser-absorbing by the use of one or more appropriate additives such as carbon black or other pigments and fills as will be known to those skilled in the art.

Preferably, therefore, the plastics material of the valve cup 2 is selected from a group consisting of semi-crystallized PET, PBT, PEN, PEN/PET copolymers, POM, acrylonitrile, polypropylene, or a blend of any of the foregoing.

The plastics neck 5 of the container 3 is also preferably selected from a group consisting of crystallized PET, PBT, PEN, PEN/PET copolymers, POM, acrylonitrile, polypropylene, or a blend of any of the foregoing. Advantageously, the whole of the container 3 is comprised of a laser-transparent plastics material. It should be appreciated that the container 3 may still be coloured and even opaque if special non-absorbing colorants are used, which are again known to those skilled in the art.

The fluid medium dispensing systems 1 that are sealed using laser welding in accordance with the invention fulfill European safety standards by providing appropriate sealing performance at temperatures greater than 50° C. whilst still enabling both the container 3 and the valve cup 2 to be made of plastics materials.

In accordance with the second aspect of the present invention an example of a method of assembling a dispensing system in accordance with the second aspect of the present invention using a valve cup 2 and container 3 as described above is now given with particular reference to FIG. 3.

In this method a bag 16 is attached to the valve 4. Initially, the valve 3 is coupled to the valve cup 2 in known manner. In general any method or coupling may be used dependent on the structure of the valve 4 and the valve cup 2. The bag 16 is then connected to the valve 4 as shown in FIG. 3(*a*). More specifically, an opening of the bag 16 is attached to a lower part of the valve 4 such that the valve 4 is in fluid communication with the interior of the bag 16 when actuated. The valve 4 may be provided with any means for facilitating this coupling. The bag 16 may be secured by any suitable means such as adhesive, welding, or clamping. The combination of bag 16 and valve 4 in a fixed arrangement is generally referred to as a 'bag on valve' (BoV). The bag 16 is preferably liquid, gas, or fluid impermeable.

Once the bag 16 is securely attached to the valve 4, the bag 16 may be folded to reduce the footprint thereof. As shown in FIG. 3(*b*), the bag 16 may be folded in such a way that the footprint is less than the diameter of the valve cup 2. Preferably, the footprint is less than the diameter of the opening 6 of a container 3 to which the valve cup 2 is to be assembled such that the BoV may be inserted into the opening 6. The folded BoV is then inserted directly into the container 3, as is shown in FIG. 3(*c*). In this step, the BoV is inserted through the opening 6 of the container 3 while being maintained in the folded state to improve the ease of insertion.

Once partially inserted, the inner region of the container 3 may be charged with gas, preferably a propellant gas. Suitable propellants are known in the art and are not discussed further herein. The method used is preferably undercup gassing, which essentially means that the propellant is passed under the valve cup 2 and into the region between the bag 16 and the inner volume of the container 3. In the present invention, the inner volume of the container 3 may be pressurized to a pressure up to 3 bar, preferably between 1.5 and 2.5 bar inclusive.

Once pressurization of the container 3 is complete, the first part 9 of the valve cup 2 is pressed into the container 3. As described above, the valve cup 2 is pressed into the opening 6 of the neck 5 with a force that is between 343 and 442 N, preferably the force is around 392 N. At the same time the second part 10 of the valve cup 2 is snap-fitted over the rim 7 of the neck 5. This ensures a stable connection between the valve cup 2 and the container 3 that will withstand the pressure exerted on the valve cup 2 by the pressurized contents of the container 3. As described above, the interference fit between the valve cup 2 and the neck 5 of the container 3 is created by manufacturing the inner part 9 of the valve cup 2 so that it has an outer diameter which is between 0.05 mm and 0.15 mm inclusive, and in particular 0.10 mm, greater than the inner diameter of the opening 6.

The dispensing system 1 is then sealed by fusing the plastics materials of the valve cup 2 and the container 3 together to form the molten weld seam 15*a* and/or 15*b* by laser welding. During this process one or more focused laser beams 17 are directed at the interface between the valve cup 2 and the neck 5 of the container as described above and shown in greater detail in FIG. 1. The container 3 is preferably rotated relative to the beam or beams 17 so that the molten weld seam 15*a* and/or 15*b* is formed around the totality of the opening 6 in the neck 5 around the whole periphery of the first part 9 of the valve cup 2.

Once the laser welding has taken place, the dispensing system 1 is filled with the fluid medium to be dispensed. This is usually passed through the valve 4 into the bag 16 by appropriate channels provided for this purpose that are thereafter close. The pressure in the container 3 increases as the bag 16 fills with the fluid medium. Preferably, the pressure increases to around 6 to 8 bar, preferably 6.5 to 7.5 bar. This increase in pressure aids in dispensing the fluid medium when the valve 50 is actuated by a user.

Additional assembly steps are also possible, such as adding a protective overcap 18 to cover the exposed part of the valve 4, as shown in FIG. 3(*e*). A shrink-wrap covering (not shown) may also be applied to the exterior of the container 3.

While the method above describes a method of assembling a BOV dispensing system, it will be appreciated that other methods in accordance with the present invention that do not include a bag 16 are possible. In dispensing systems wherein a bag 16 is not used, the internal volume of the container 3 is charged with the fluid medium to be dispensed prior to pressing of the valve cup 2 into the container. A propellant is then added to the contents of the container after formation of the molten weld seam via channels in the valve 4 in conventional fashion.

The invention claimed is:

1. A fluid medium dispensing system comprising:
   a container for storing a fluid medium under pressure, the container comprising a neck defining an opening;
   a valve; and
   a valve cup adapted to support the valve and close the opening of the container, contiguous portions of the valve cup and the neck being comprised of plastics materials;
   wherein the valve cup is an interference fit in the neck of the container with contact between said plastics materials of the valve cup and of the neck around the whole periphery of that part of the valve cup inserted into the neck, and
   wherein valve cup comprises an inner part that is located in the opening of the container and wherein the outer diameter of the inner part of the valve cup prior to pressing of the valve cup into the opening of the container is between 0.05 mm and 0.15 mm inclusive greater than the inner diameter of the opening in order to create the interference fit, and
   wherein said plastics materials of the valve cup and the neck have been fused to form a molten weld seam by laser welding thereby sealing the container.

2. A fluid medium dispensing system as claimed in claim 1, the plastics material of the neck of the container is laser-transparent and the plastics material of the valve cup is laser-absorbing.

3. A fluid medium dispensing system as claimed in claim 2, wherein the whole of the container is comprised of a laser-transparent, plastics material.

4. A fluid medium dispensing system as claimed in claim 1, wherein the plastics material of the valve cup is a semi-crystalline polymer.

5. A fluid medium dispensing system as claimed in claim 4, wherein the plastics material of the valve cup is selected from a group consisting of semi-crystallized PET, PBT, PEN, PEN/PET copolymers, POM, acrylonitrile, polypropylene, or a blend of any of the foregoing.

6. A fluid medium dispensing system as claimed in claim 4, wherein the whole of the valve cup is comprised of one or more laser-absorbing, semi-crystalline polymers.

7. A fluid medium dispensing system as claimed in claim 1, wherein the outer diameter of the inner part of the valve cup prior to pressing of the valve cup into the opening of the container is 0.10 mm greater than the inner diameter of the opening.

8. A fluid medium dispensing system as claimed in claim 1, wherein the molten weld seam is located between the inner part of the valve cup that is pressed into the opening of the container and the neck of the container.

9. A fluid medium dispensing system as claimed in claim 8, wherein the U-shaped, annular part comprises a leg that is contiguous with the inner surface of the neck.

10. A fluid medium dispensing system as claimed in claim 1, wherein the valve cup comprises an outer, annular part that defines a U-shape in which a rim of the neck of the container is located.

11. A fluid medium dispensing system as claimed in claim 10, wherein the molten weld seam or an additional molten weld seam is located between the rim of the neck of the container and the U-shaped, outer annular part of the valve cup.

12. A fluid medium dispensing system as claimed in claim 1, wherein the second, annular part of the valve cup is formed in an inverted U-shape and is snap-fitted around the rim of the neck of the container such that the rim of the neck of the container locates in the inverted U-shape.

13. A fluid medium dispensing system as claimed in claim 1, wherein the plastics material of the neck of the container is selected from a group consisting of: crystallized PET, PBT, PEN, PEN/PET copolymers, POM, acrylonitrile, polypropylene, or a blend of any of the foregoing.

14. A method of assembling a dispensing system for dispensing a fluid medium stored under pressure, the method including:
providing a valve cup with at least a peripheral portion that is comprised of a plastics material, the valve cup including a valve;
providing a container, the container being suitable for storing a fluid medium under pressure and comprising a neck that is comprised of a plastics material and that defines an opening;
positioning the valve cup at the opening of the container;
charging the internal volume of the container;
pressing the valve cup into the neck of the container, wherein the valve cup is pressed into the neck of the container with a force between 343 and 442 N, and wherein valve cup comprises an inner part that is located in the opening of the container and wherein the outer diameter of the inner part prior to pressing of the valve cup into the opening of the container is between 0.05 mm and 0.15 mm inclusive greater than the inner diameter of the opening in order to create an interference fit between the valve cup and the neck of the container, and fusing said plastics materials of the valve cup and the neck together to form a molten weld seam by laser welding thereby sealing the container.

15. A method as claimed in claim 14, wherein prior to charging the internal volume of the container, the method comprises the additional steps of providing a bag, attaching the valve to an opening of the bag, fluidly sealing the bag to the valve and inserting the bag into the container.

16. A method as claimed in claim 15, wherein the internal volume of the container is pressurized with a propellant and the bag is filled with a fluid medium to be dispensed after formation of the molten weld seam.

17. A method as claimed in claim 16, wherein the internal volume of the container between an inside wall of the container and an outside surface of the bag is pressurized at up to 13 bar.

18. A method as claimed in claim 17, wherein the internal volume of the container between the inside wall of the container and the outside surface of the bag is pressurized at up to 3 bar.

19. A method as claimed in claim 14, wherein the internal volume of the container is charged with a fluid medium to be dispensed and a propellant is added to the contents of the container after formation of the molten weld seam.

20. A method as claimed in claim 14, wherein the valve cup is pressed into the neck of the container with a force around 392 N.

21. A method as claimed in claim 14, wherein the outer diameter of the inner part of the valve cup prior to pressing of the valve cup into the opening of the container is 0.10 mm greater than the inner diameter of the opening.

22. A method as claimed in claim 14, wherein the molten weld seam is located between the inner part of the valve cup that is pressed into the opening of the container and the neck of the container.

23. A method as claimed in claim 14, wherein the valve cup comprises an outer, annular part that defines a U-shape in which a rim of the neck of the container is located and wherein the molten weld seam or an additional molten weld seam is located between the rim of the neck of the container and the U-shaped, outer annular part of the valve cup.

24. A method as claimed in claim 14, wherein the second, annular part of the valve cup is formed in an inverted U-shape and is snap-fitted around the rim of the neck of the container such that the rim of the neck of the container locates in the inverted U-shape.

25. A method as claimed in claim 14, wherein the valve cup is comprised of a semi-crystalline, laser-absorbing polymer.

26. A method as claimed in claim 25, wherein the valve cup is comprised of a semi-crystalline, laser-absorbing polymer selected from a group consisting of semi-crystallized PET, PBT, PEN, PEN/PET copolymers, POM, acrylonitrile, polypropylene, or a blend of any of the foregoing.

27. A method as claimed in claim 14, wherein the container is comprised of a laser-transparent plastics material.

28. A method as claimed in claim 27, wherein container is comprised of a laser-transparent plastics material selected from a group consisting of: crystallized PET, PBT, PEN, PEN/PET copolymers, POM, acrylonitrile, polypropylene, or a blend of any of the foregoing.

* * * * *